United States Patent
Arakawa et al.

(10) Patent No.: US 11,885,515 B2
(45) Date of Patent: Jan. 30, 2024

(54) AIR CONDITIONING SYSTEM TO CALCULATE INDOOR AIR QUALITY INDEX TO CONTROL AIR VENTILATION

(71) Applicant: Panasonic Intellectual Property Management Co., Ltd., Osaka (JP)

(72) Inventors: Ryo Arakawa, Aichi (JP); Yoshifumi Watabe, Osaka (JP); Hirofumi Kubota, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 172 days.

(21) Appl. No.: 17/604,979

(22) PCT Filed: Feb. 3, 2020

(86) PCT No.: PCT/JP2020/003887
§ 371 (c)(1),
(2) Date: Oct. 19, 2021

(87) PCT Pub. No.: WO2020/217630
PCT Pub. Date: Oct. 29, 2020

(65) Prior Publication Data
US 2022/0214059 A1 Jul. 7, 2022

(30) Foreign Application Priority Data
Apr. 22, 2019 (JP) .................. 2019-081043

(51) Int. Cl.
*F24F 11/30* (2018.01)
*F24F 11/64* (2018.01)
(Continued)

(52) U.S. Cl.
CPC .............. *F24F 11/30* (2018.01); *F24F 7/003* (2021.01); *F24F 11/64* (2018.01); *F24F 7/007* (2013.01);
(Continued)

(58) Field of Classification Search
CPC .. F24F 11/30; F24F 7/003; F24F 11/64; F24F 7/007; F24F 2110/10; F24F 2110/20;
(Continued)

(56) References Cited

U.S. PATENT DOCUMENTS

| | | | |
|---|---|---|---|
| 2006/0064204 A1* | 3/2006 | Kim | F24F 11/56 700/276 |
| 2010/0015906 A1 | 1/2010 | Takahashi et al. | |

(Continued)

FOREIGN PATENT DOCUMENTS

| | | |
|---|---|---|
| JP | 2008-209034 A | 9/2008 |
| JP | 2009-210234 A | 9/2009 |

(Continued)

OTHER PUBLICATIONS

Wan, G.H., Chung, F.F. and Tang, C.S., 2011. Long-term surveillance of air quality in medical center operating rooms. American journal of infection control, 39(4), pp. 302-308. (Year: 2011).*

(Continued)

*Primary Examiner* — Alicia M. Choi
(74) *Attorney, Agent, or Firm* — Rimon P.C.

(57) ABSTRACT

An air conditioning system includes: a sensor; an obtainer that obtains information indicating air quality in an indoor space, which is output by the sensor; and a controller that calculates an air quality index based on the information obtained, and controls a ventilator, based on the air quality index calculated. The air quality index is expressed by $f(X_n) \times g(T, H)$, where $f(X_n)$ denotes a function with respect to $X_n$ that indicates at least one of a $CO_2$ concentration, a (Continued)

concentration of total volatile organic compounds (TVOC), a concentration of particulate matter (PM), an $NO_X$ concentration, an $SO_X$ concentration, an $O_3$ concentration, a mold count, or a dust count, and g(T, H) denotes a function with respect to T denoting temperature and H denoting humidity in the indoor space.

10 Claims, 9 Drawing Sheets

(51) Int. Cl.
  *F24F 7/003* (2021.01)
  *F24F 110/20* (2018.01)
  *F24F 110/66* (2018.01)
  *F24F 110/10* (2018.01)
  *F24F 7/007* (2006.01)

(52) U.S. Cl.
  CPC ....... *F24F 2110/10* (2018.01); *F24F 2110/20* (2018.01); *F24F 2110/66* (2018.01)

(58) Field of Classification Search
  CPC .... F24F 2110/66; F24F 11/63; F24F 11/0001; F24F 2110/50; Y02B 30/70; G06Q 50/26
  See application file for complete search history.

(56) References Cited

U.S. PATENT DOCUMENTS

| | | | |
|---|---|---|---|
| 2015/0032264 A1* | 1/2015 | Emmons | F24F 11/0001 700/276 |
| 2017/0176030 A1* | 6/2017 | Emmons | F24F 11/62 |
| 2017/0336343 A1* | 11/2017 | Bhat | G01N 27/4163 |
| 2018/0010818 A1* | 1/2018 | Maruyama | F24F 11/30 |
| 2019/0328278 A1* | 10/2019 | Zabel | A61B 5/0816 |
| 2021/0232484 A1* | 7/2021 | Keneally | G06F 9/54 |

FOREIGN PATENT DOCUMENTS

| | | | |
|---|---|---|---|
| JP | 2009-230907 A | | 10/2009 |
| JP | 2017-227434 A | | 12/2017 |
| KR | 20150068160 A | * | 6/2015 |
| KR | 20160112844 A | * | 9/2016 |
| KR | 20170038389 A | * | 4/2017 |
| WO | 2014/185013 A1 | | 11/2014 |

OTHER PUBLICATIONS

Saad, S.M., Shakaff, A.Y.M., Saad, A.R.M., Yusof, A.M., Andrew, A.M., Zakaria, A. and Adom, A.H., Mar. 2017. Development of indoor environmental index: Air quality index and thermal comfort index. In AIP Conference Proceedings (vol. 1808, No. 1, p. 020043). AIP Publishing LLC. (Year: 2017).*

Atthajariyakul, S. and Leephakpreeda, T., 2004. Real-time determination of optimal indoor-air condition for thermal comfort, air quality and efficient energy usage. Energy and Buildings, 36(7), pp. 720-733. (Year: 2004).*

Taheri, S. and Razban, A., 2021. Learning-based CO2 concentration prediction: Application to indoor air quality control using demand-controlled ventilation. Building and Environment, 205, p. 108164. (Year: 2021).*

Lee, S.C. and Chang, M., 2000. Indoor and outdoor air quality investigation at schools in Hong Kong. Chemosphere, 41(1-2), pp. 109-113. (Year: 2000).*

International Search Report issued in corresponding International Patent Application No. PCT/JP2020/003887, dated Mar. 31, 2020, with English translation.

* cited by examiner

FIG. 3

| CO2 | | | PM | | | TVOC | | |
|---|---|---|---|---|---|---|---|---|
| ppm | ln (ppm) | | ppm | ln (ppm) | | µg/m³ | ln (ppm) | |
| 1.1 | 0.1 | | 1.1 | 0.10 | | 1.1 | 0.09531 | |
| 10 | 2.3 | | 10 | 2.30 | | 10 | 2.30 | |
| 100 | 4.6 | | 30 | 3.40 | | 50 | 3.91 | |
| 1000 | 6.9 | | 100 | 4.61 | | 100 | 4.61 | |
| 2500 | 7.8 | | 500 | 6.21 | | 400 | 5.99 | |
| 5000 | 8.5 | | 1000 | 6.91 | | 600 | 6.40 | |
| 10000 | 9.2 | | | | | 800 | 6.68 | |
| | | | | | | 1000 | 6.91 | |

FIG. 4

| Discomfort index | Body sensations |
|---|---|
| Less than 55 | Cold |
| 55 to 60 | Chilly |
| 60 to 65 | Nothing particular |
| 65 to 70 | Pleasant |
| 70 to 75 | Not hot |
| 75 to 80 | Slightly hot |
| 80 to 85 | Hot and sweaty |
| 85 and over | Unbearably hot |

AIR CONDITIONING SYSTEM TO CALCULATE INDOOR AIR QUALITY INDEX TO CONTROL AIR VENTILATION

CROSS-REFERENCE OF RELATED APPLICATIONS

This application is the U.S. National Phase under 35 U.S.C. § 371 of International Patent Application No. PCT/JP2020/003887, filed on Feb. 3, 2020, which in turn claims the benefit of Japanese Application No. 2019-081043, filed on Apr. 22, 2019, the entire disclosures of which Applications are incorporated by reference herein.

TECHNICAL FIELD

The present invention relates to an air conditioning system.

BACKGROUND ART

Conventionally, a technology for improving indoor air quality has been proposed. For example, Patent Literature (PTL) 1 discloses an air cleaner that allows a user to readily recognize that the air in a room has a PM2.5 concentration that affects health.

CITATION LIST

Patent Literature

[PTL 1] Japanese Unexamined Patent Application Publication No. 2017-227434

SUMMARY OF INVENTION

Technical Problem

As a general technology for improving air quality, a technology for controlling a ventilating device based on, for example, a PM2.5 concentration in a room has been known. With such a technology, a gas concentration other than the PM2.5 concentration is not considered, and thus it is difficult to sufficiently improve air quality in the room.

The present invention provides an air conditioning system that can effectively improve air quality in an indoor space.

Solution to Problem

An air conditioning system according to an aspect of the present invention includes: a sensor that measures air quality in an indoor space; an obtainer that obtains information indicating the air quality in the indoor space, the information being output by the sensor; and a controller that calculates an air quality index based on the information obtained, and controls a ventilator that ventilates the indoor space, based on the air quality index calculated. The air quality index is expressed by $f(X_n) \times g(T, H)$, where $f(X_n)$ denotes a function with respect to $X_n$ that indicates at least one of a $CO_2$ concentration, a concentration of total volatile organic compounds (TVOC), a concentration of particulate matter (PM), an $NO_X$ concentration, an $SO_X$ concentration, an $O_3$ concentration, a mold count, or a dust count, and $g(T, H)$ denotes a function with respect to T denoting temperature and H denoting humidity in the indoor space.

Advantageous Effects of Invention

The air conditioning system according to the present invention can effectively improve air quality in an indoor space.

BRIEF DESCRIPTION OF DRAWINGS

FIG. 3 illustrates values obtained by substituting gas concentrations such as a $CO_2$ concentration, a particulate matter (PM) concentration, and a concentration of total volatile organic compounds (TVOC) into equations for obtaining natural logarithms.

FIG. 4 illustrates a relation between values of a discomfort index and general body sensations.

DESCRIPTION OF EMBODIMENTS

Figure 1:
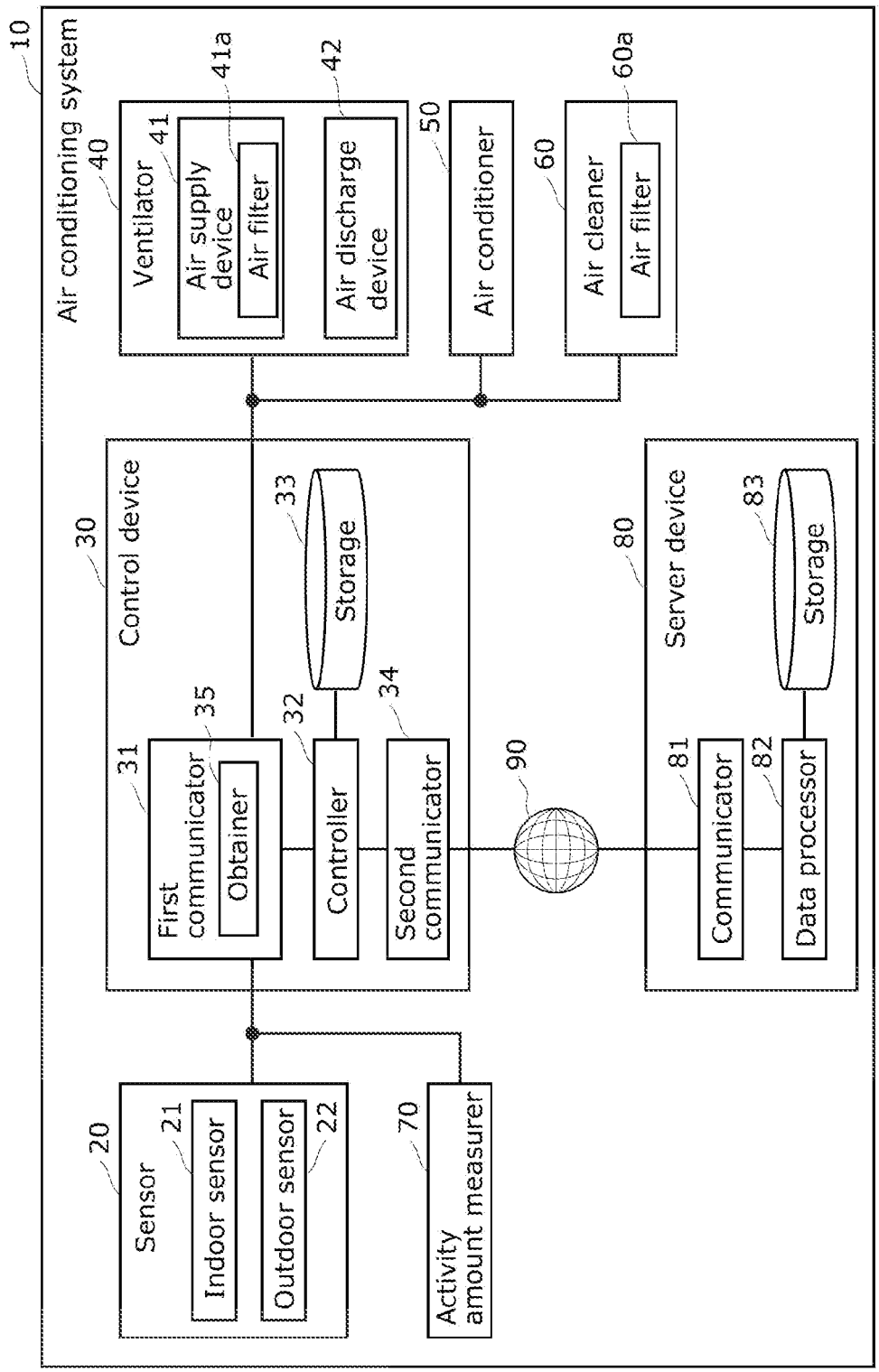
FIG. 1 is a block diagram illustrating a functional configuration of an air conditioning system according to an embodiment.

The following describes embodiments with reference to the drawings. Note that the embodiments described below each show a general or particular example. The numerical values, shapes, materials, elements, the arrangement and connection of the elements, steps, and the order of processing the steps, for instance, described in the following embodiments are examples, and thus are not intended to limit the present invention. Among the elements in the following embodiments, elements not recited in any of the independent claims are described as arbitrary elements.

Note that the diagrams are schematic diagrams, and do not necessarily provide strictly accurate illustration. In the drawings, the same numeral is given to a substantially same configuration, and a redundant description thereof may be omitted or simplified.

Embodiment

Configuration

First, a configuration of an air conditioning system according to an embodiment is to be described. FIG. 1 is a block diagram illustrating a functional configuration of the air conditioning system according to the embodiment. Air conditioning system 10 controls devices using a general air quality index, in order to improve air quality in an indoor space (a closed space) (IAQ: indoor air quality) within a building such as a house, an office, or a hospital. As illustrated in FIG. 1, air conditioning system 10 includes sensor 20, control device 30, ventilator 40, air conditioner 50, air cleaner 60, activity amount measurer 70, and server device 80, specifically.

Sensor 20 includes indoor sensor 21 and outdoor sensor 22. Indoor sensor 21 measures air quality in an indoor space, and outputs information indicating the air quality in the indoor space as a measurement result. Indoor sensor 21 can communicate with control device 30, and transmit information indicating air quality to control device 30. Air quality is expressed by at least one of, for instance, a gas concentration, a mold count, a dust count, temperature, or humidity in an indoor space, and indoor sensor 21 can measure at least one of those, that is, a gas concentration, a mold count, a dust count, temperature, or humidity. Specifically, indoor sensor 21 is achieved by a semiconductor gas sensor, a temperature sensor, or a humidity sensor, for instance.

More specifically, the gas concentration includes at least one of a $CO_2$ concentration, a concentration of total volatile organic compounds (a TVOC concentration), a particulate matter (PM) concentration, a nitrogen oxide ($NO_X$) concentration, a sulfur oxide ($SO_X$) concentration, or an ozone ($O_3$) concentration.

Outdoor sensor 22 measures air quality in an outdoor space in the surrounding of the above indoor space, and outputs information indicating the air quality in the outdoor space as a measurement result. Outdoor sensor 22 can communicate with control device 30, and transmit information indicating air quality to control device 30. Outdoor sensor 22 has the same configuration as that of indoor sensor 21 except that the measurement target is an outdoor space, and is achieved by, for instance, a semiconductor gas sensor, a temperature sensor, or a humidity sensor, specifically.

Control device 30 obtains, from sensor 20, information that indicates air quality in an indoor space or information that indicates air quality in an outdoor space, and calculates a general air quality index based on the obtained information. Control device 30 controls ventilator 40 and air conditioner 50, based on the calculated general air quality index. Specifically, control device 30 includes first communicator 31, controller 32, storage 33, and second communicator 34.

First communicator 31 is a communication module (communication circuit) for control device 30 to communicate with sensor 20, ventilator 40, air conditioner 50, air cleaner 60, and activity amount measurer 70, via a local communication network. Communication established by first communicator 31 may be wired communication or wireless communication. A communication standard used for the communication is not limited in particular. First communicator 31 includes obtainer 35.

Controller 32 calculates a general air quality index, and controls ventilator 40 and air conditioner 50, for instance, based on the calculated general air quality index. Specifically, controller 32 is achieved by a processor, a microcomputer, or a dedicated circuit. Controller 32 may be achieved by a combination of at least two of a processor, a microcomputer, and a dedicated circuit.

Storage 33 is a storage device that stores, for instance, computer programs executed by controller 32 to control devices based on the general air quality index. Specifically, storage 33 is achieved by a semiconductor memory, for instance.

Second communicator 34 is a communication module (communication circuit) for control device 30 to communicate with server device 80 via wide-area communication network 90 such as the Internet. Communication established by second communicator 34 may be wireless communication or wired communication. A communication standard used for the communication is not limited in particular.

Ventilator 40 ventilates an indoor space, based on a control signal received from control device 30. Ventilator 40 includes air supply device 41 that supplies air from an outdoor space to an indoor space, and air discharge device 42 that discharges air from the indoor space to the outdoor space. Air supply device 41 and air discharge device 42 are both achieved by blowers (fans), for example.

Note that air supply device 41 may include air filter 41a. Air filter 41a decreases the concentration of at least one of PM, $NO_X$, $SO_X$, and $O_3$ in the air to be supplied to the indoor space. Specifically, air supply device 41 takes in air from the outdoor space, filters the air using air filter 41a, and discharges the filtered air into the indoor space. An example of air filter 41a is a high efficiency particulate air (HEPA) filter.

Air conditioner 50 adjusts the temperature and the humidity in the indoor space, based on a control signal received from control device 30.

Air cleaner 60 is an example of a removal device, and has a function of decreasing the concentration of at least one of PM, $NO_X$, $SO_X$, and $O_3$ in the indoor space. Air cleaner 60 is, for example, fan-type cleaner 60, includes air filter 60a, takes in the air in the indoor space, filters the air using air filter 60a, and discharges the filtered air into the indoor space. An example of air filter 60a is an HEPA filter. In the following embodiments, ventilator 40 and air conditioner 50 are main targets to be controlled by control device 30, yet air cleaner 60 may be a target to be controlled by control device 30. Thus, control device 30 controls air cleaner 60 (causes air cleaner 60 to operate) to bring the general air quality index close to a target range.

Activity amount measurer 70 is a wearable activity amount measuring device that a person staying in the indoor space (for example, a resident of a house) wears. Activity amount measurer 70 may be a non-contact type activity amount measuring device achieved by a radio sensor and disposed in the indoor space. Specifically, activity amount measurer 70 measures the activity amount of a person staying in the indoor space, based on, for instance, motion of the body of the person, and outputs information indicating the activity amount. Activity amount measurer 70 can communicate with control device 30, and transmit information indicating the activity amount to control device 30. The activity amount can be expressed in units of metabolic equivalents (METs).

Server device 80 is a cloud server that collects data related to device control using the general air quality index from a plurality of control devices that include control device 30, and manages the data. Server device 80 includes communicator 81, data processor 82, and storage 83.

Communicator 81 is a communication module (communication circuit) for server device 80 to communicate with control device 30 via wide-area communication network 90. Communication established by communicator 81 may be wired communication or wireless communication. A communication standard used for the communication is not limited in particular.

Data processor 82 performs information processing for collecting and managing data related to device control using the general air quality index. Specifically, data processor 82 is achieved by a processor, a microcomputer, or a dedicated circuit. Data processor 82 may be achieved by a combination of at least two of a processor, a microcomputer, and a dedicated circuit.

Storage 83 is a storage device that stores, for instance, computer programs that data processor 82 executes to process the above data. Storage 83 is achieved by a semiconductor memory or a hard disk drive (HDD), specifically.

Operation Example 1

Figure 2:
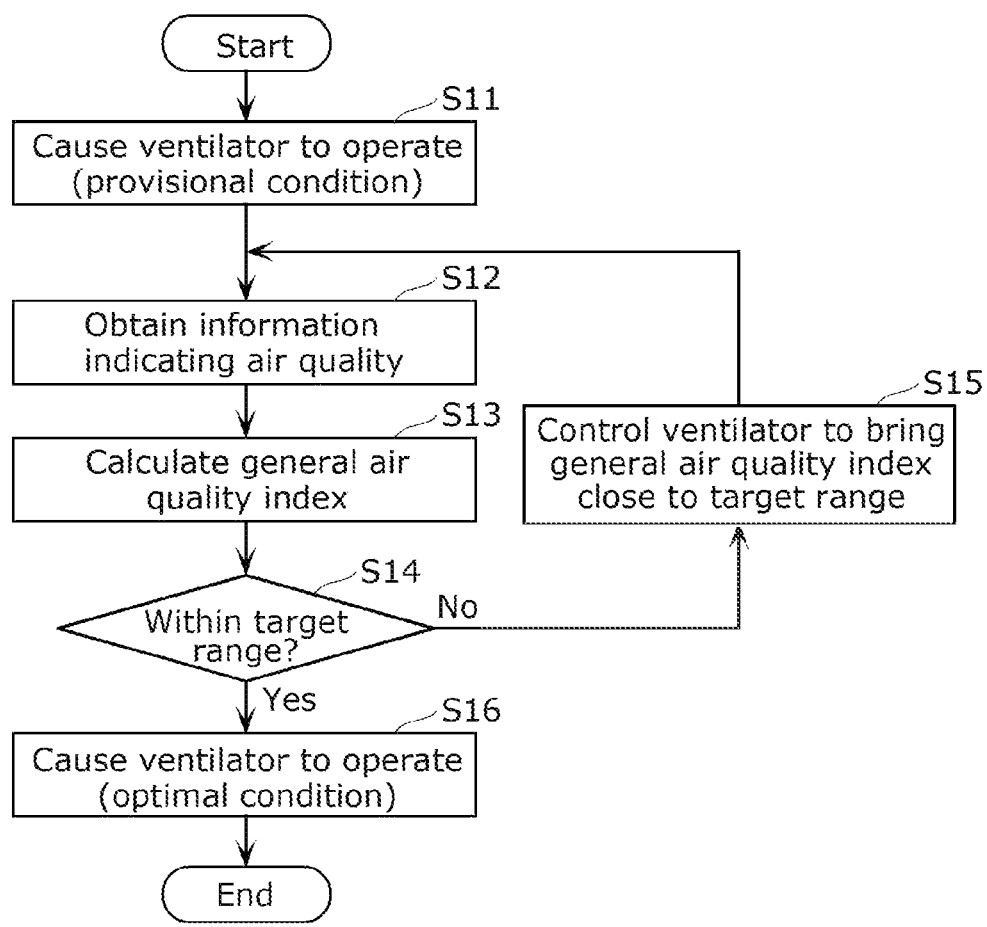
FIG. 2 is a flowchart illustrating Operation Example 1 of the air conditioning system according to the embodiment.

Next, Operation Example 1 of air conditioning system 10 is to be described with reference to FIG. 2. FIG. 2 is a flowchart illustrating Operation Example 1 of air conditioning system 10. In Operation Example 1, control device 30 calculates a general air quality index based on information indicating air quality, which is obtained from indoor sensor 21 of sensor 20, and controls ventilator 40 based on the calculated general air quality index.

First, the general air quality index used in Operation Example 1 is to be described. The general air quality index used in Operation Example 1 is expressed by $f(X_n) \times g(T, H)$, where $f(X_n)$ denotes a function with respect to $X_n$ that indicates a concentration of at least one of $CO_2$, TVOC, PM, $NO_X$, $SO_X$, or $O_3$ or at least one of a mold count or a dust count, and $g(T, H)$ denotes a function with respect to temperature T and humidity H in an indoor space. More specifically, $f(X_n)$ is expressed by (Expression 1) below. Note that $f(X_n)$ is expressed as $f(X_1)$ when n=1, and as $f(X_1, \ldots, X_n)$ when n≥2.

[Math. 1]

$$f(X_n) = \frac{1}{\sum_{k=1}^{n} a_k \cdot \ln(X_k)} \quad \text{(Expression 1)}$$

In (Expression 1), an is a coefficient. For example, when n=3, $X_1$ denotes a $CO_2$ concentration, $X_2$ denotes a PM concentration, and $X_3$ denotes a TVOC concentration, $a_1$, $a_2$, and $a_3$ denote coefficients (or in other words, weights) for adjusting the degrees of influence exerted by a $CO_2$ concentration, a PM concentration, and a TVOC concentration on the general air quality index. A specific value of $a_n$ is appropriately determined based on experience or experiments.

Further, ln denotes a natural logarithm. FIG. 3 illustrates values obtained by substituting gas concentrations such as a $CO_2$ concentration, a PM concentration, and a TVOC concentration into equations for obtaining natural logarithms.

In FIG. 3, the hatched values of gas concentrations show reference concentrations (in other words, reference values), and if a gas concentration exceeds its reference concentration in an indoor space, the gas has a harmful effect on human bodies. For example, the reference concentration of the $CO_2$ concentration is 1000 ppm, the reference concentration of the PM concentration is 30 ppm, and the reference concentration of the TVOC concentration is 400 μg/m³. In this manner, a reference concentration greatly varies depending on a type of a gas, and thus if the value of a gas concentration is used as it is to calculate the general air quality index, the degree of influence on the general air quality index greatly varies depending on a type of a gas. However, as illustrated in FIG. 3, if the general air quality index is calculated using natural logarithms of gas concentrations, the degrees of influence of the gas concentrations on the general air quality index can be smoothed. In other words, a difference of the degrees of influence of the gas concentrations on the general air quality index can be decreased.

Note that it is not essential to use a natural logarithm of a gas concentration for $f(X_n)$ and, for example, the influence of gas concentrations on the general air quality index can be smoothed also by normalizing gas concentration $X_n$ based on reference concentration $c_n$. (Expression 1') stated below expresses $f(X_n)$ in this case.

[Math. 2]

$$f(X_n) = \frac{1}{\sum_{k=1}^{n} a_k \cdot X_k / C_k} \quad \text{(Expression 1')}$$

On the other hand, (Expression 2) stated below expresses $g(T, H)$.

[Math. 3]

$$g(T, H) = \frac{\beta}{\alpha + \text{ABS}(DI(T, H) - 67.5)} \quad \text{(Expression 2)}$$

In (Expression 2), α and β are coefficients. α is a coefficient that prevents the denominator of (Expression 2) from being 0, and is a positive constant. β is a positive constant that acquires balance between the degrees of influence of $f(X_n)$ and $g(T, H)$ on the general air quality index.

ABS denotes a function for obtaining an absolute value of a numerical value. DI(T, H) denotes a function for obtaining a discomfort index, and is, for example, DI(T, H)=0.81T+0.01H×(0.99T−14.3)+46.3. FIG. 4 illustrates a relation between values of the discomfort index and general body sensations, and 67.5 in (Expression 2) is based on a value of a discomfort index (the central value) for a person to feel comfortable.

As can be seen from (Expression 1) above, $f(X_n)$ has a greater value as a gas concentration in an indoor space is lower. Thus, the better the air quality of the indoor space is, the greater positive value $f(X_n)$ has. In addition, as can be seen from (Expression 2) above, $g(T, H)$ has a greater positive value as a person feels more comfortable. Thus, the general air quality index in Operation Example 1 expressed by a product of $f(X_n)$ and $g(T, H)$ has a positive value, and indicates that the air quality is higher as the value is greater, and is lower as the value is closer to zero.

Next, details of Operation Example 1 in which such a general air quality index is used are to be continuously described with reference to FIG. 2.

First, controller 32 of control device 30 causes ventilator 40 to operate under a provisional condition (S11). Specifically, controller 32 causes first communicator 31 to transmit, to ventilator 40, a control signal for causing ventilator 40 to operate under the provisional condition.

Next, obtainer 35 obtains (receives) information indicating air quality in an indoor space, which is output by indoor sensor 21 of sensor 20 (S12).

Next, controller 32 calculates a general air quality index, based on the obtained information (S13). Subsequently, controller 32 determines whether the value of the calculated general air quality index is within a target range (a range of values considered to be optimal, an optimal range) (S14). The target range of the general air quality index is appropriately determined based on experience or experiments. Note that the target range of the general air quality index differs depending on a combination of gas concentrations used to calculate the general air quality index.

If controller 32 determines that the value of the calculated general air quality index is out of the target range (No in S14), controller 32 controls ventilator 40 to bring the general air quality index close to the target range (S15). Specifically, controller 32 causes first communicator 31 to transmit a control signal to ventilator 40. For example, if the value of $f(X_n)$ is small, controller 32 estimates that the concentration of a pollutant (such as PM, TVOC, or $CO_2$), and actively ventilates the indoor space by increasing the operating ratio of ventilator 40. In the following, until controller 32 determines that the value of the calculated general air quality index is within the target range, the processing from steps S12 to S15 is repeated.

For example, if a large amount of warm (or cold) air flows into the indoor space or the indoor space becomes dry due to air having low humidity as a result of actively ventilating the indoor space, the value of g(T, H) then decreases, resulting in a decrease in the value of the general air quality index. Accordingly, controller 32 brings the value of the general air quality index to the target range by controlling ventilator 40 while acquiring balance between such matters.

On the other hand, when controller 32 determines that the value of the calculated general air quality index is within the target range (Yes in S14), controller 32 causes ventilator 40 to operate under an optimal condition (for example, a setting condition for maintaining the current state) (S16).

As described above, in Operation Example 1, ventilator 40 is controlled using the general air quality index. The air quality is considered based on a concentration of a pollutant such as PM, TVOC, or $NO_X$, temperature, and humidity, yet ventilator 40 is generally controlled based not on the influence of a combination of such factors but on the influence of a single factor such as the magnitude of the PM2.5 concentration, for example.

In view of this, air conditioning system 10 controls ventilator 40, based on the general air quality index for which the degrees of influence exerted by the concentration of a pollutant, temperature, and humidity. According to the general air quality index, whether a person is actually feeling that the air quality is pleasant in the indoor space can be quantitatively determined, and thus air conditioning system 10 can effectively improve the air quality of the indoor space.

Further, in Operation Example 1, the result of controlling ventilator 40 is reflected (fed back) on the general air quality index. Thus, air conditioning system 10 can steadily improve the air quality in the indoor space.

Operation Example 2

Figure 5:
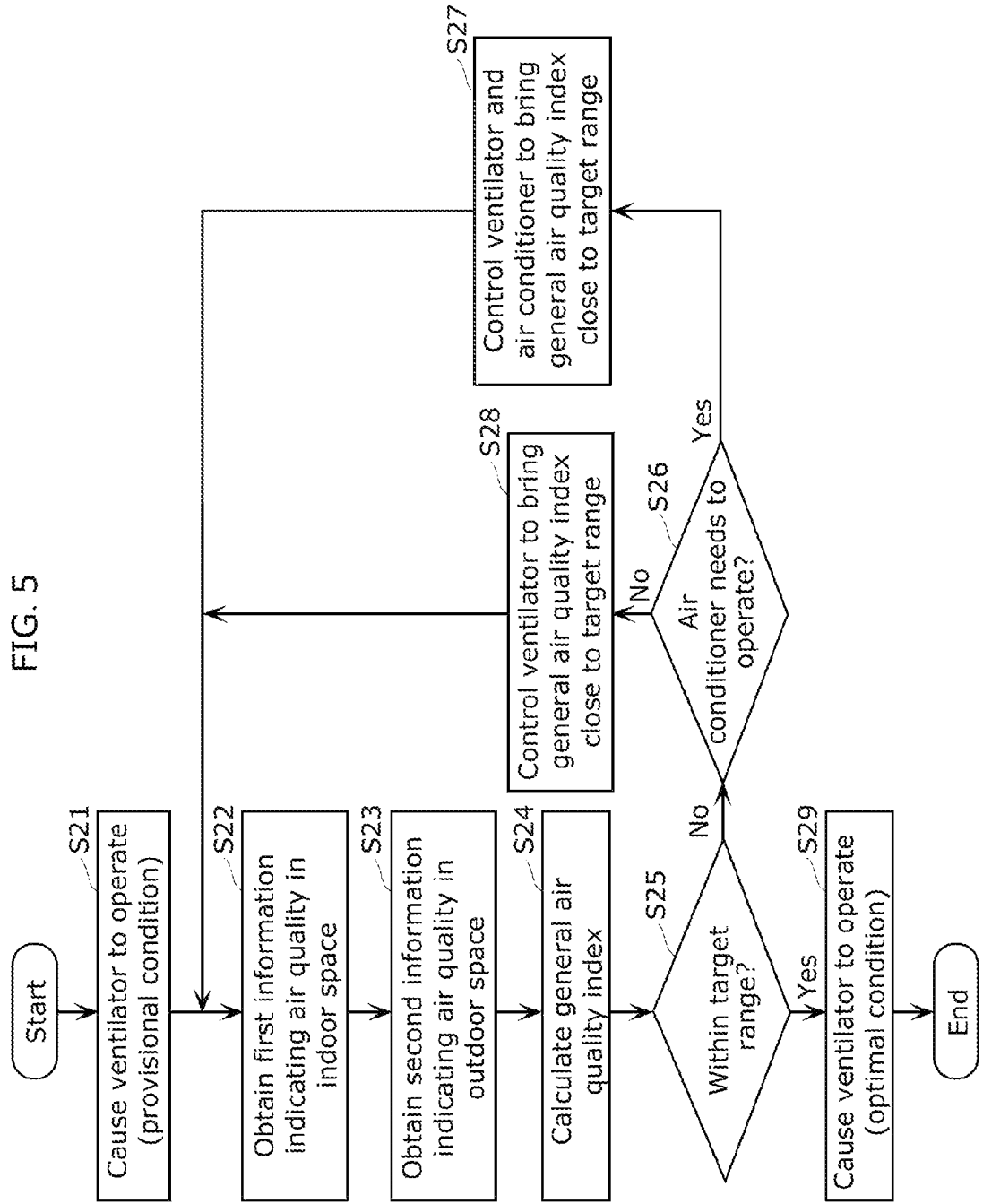
FIG. 5 is a flowchart illustrating Operation Example 2 of the air conditioning system according to the embodiment.

Next, Operation Example 2 of air conditioning system 10 is to be described with reference to FIG. 5. FIG. 5 is a flowchart illustrating Operation Example 2 of air conditioning system 10. In Operation Example 2, control device 30 calculates a general air quality index based on information indicating air quality, which is obtained from indoor sensor 21 of sensor 20, and information indicating air quality, which is obtained from outdoor sensor 22 of sensor 20, and controls ventilator 40 and air conditioner 50 based on the calculated general air quality index.

First, the general air quality index used in Operation Example 2 is to be described. The general air quality index used in Operation Example 2 is expressed by $f(X_n) \times g_{in}(T_{in}, H_{in}) \times g_{out}(T_{out}, H_{out})$. Here, $g_{in}(T_{in}, H_{in})$ is a function with respect to temperature $T_{in}$ and humidity $H_{in}$ in an indoor space, and is substantially the same as g(T, H) in Operation Example 1. Further, $g_{out}(T_{out}, H_{out})$ is a function with respect to temperature $T_{out}$ and humidity $H_{out}$ in an outdoor space, and is substantially the same as a function resulting from replacing T with outdoor temperature and H with outdoor humidity in g(T, H) in Operation Example 1.

Next, details of Operation Example 2 in which such a general air quality index is used are to be continuously described with reference to FIG. 5.

First, controller 32 of control device 30 causes ventilator 40 to operate under a provisional condition (S21). Specifically, controller 32 causes first communicator 31 to transmit, to ventilator 40, a control signal for causing ventilator 40 to operate under the provisional condition.

Next, obtainer 35 obtains (receives) first information indicating air quality in an indoor space, which is output by indoor sensor 21 of sensor 20 (S22), and obtains (receives) second information indicating air quality in an outdoor space, which is output by outdoor sensor 22 (S23).

Next, controller 32 calculates a general air quality index, based on the obtained first information and the obtained second information (S24). Subsequently, controller 32 determines whether the value of the calculated general air quality index is within a target range (S25). The target range of the general air quality index is appropriately determined based on experience or experiments. Note that the target range of the general air quality index differs depending on a combination of gas concentrations used to calculate the general air quality index.

If controller 32 determines that the value of the calculated general air quality index is out of the target range (No in S25), controller 32 determines whether air conditioner 50 needs to operate (S26). Specifically, controller 32 determines whether an air quality index obtained when $g_{in}(T_{in}, H_{in})$ is assumed to be 1 (or in other words, $f(X_n) \times g_{out}(T_{out}, H_{out})$) can be caused to reach the target range by causing only ventilator 40 to operate. For example, the value of $g_{out}(T_{out}, H_{out})$ is low under circumstances where a person feels uncomfortable in the outside. If the value of $g_{out}(T_{out}, H_{out})$ is too small (for example, if the value of $g_{out}(T_{out}, H_{out})$ is smaller than a predetermined value), even if ventilator 40 is caused to operate to increase the value of $f(X_n)$, the general air quality index may not reach the target range. In such a case, it is necessary to cause the general air quality index to reach the target range by causing not only ventilator 40, but also air conditioner 50 to operate to increase the value of $g_{in}(T_{in}, H_{in})$.

In view of this, controller 32 determines it is necessary to cause air conditioner 50 to operate if the air quality index obtained when $g_{in}(T_{in}, H_{in})$ is assumed to be 1 cannot be caused to reach the target range by causing only ventilator 40 to operate (Yes in S26). In this case, controller 32 controls ventilator 40 and air conditioner 50 to bring the general air quality index close to the target range (S27). Specifically, controller 32 causes first communicator 31 to transmit a control signal to each of ventilator 40 and air conditioner 50.

Controller 32 determines it is unnecessary to cause air conditioner 50 to operate if the air quality index obtained when $g_{in}(T_{in}, H_{in})$ is assumed to be 1 can be caused to reach the target range by causing only ventilator 40 to operate (No in S26). In this case, controller 32 selectively controls only ventilator 40 out of ventilator 40 and air conditioner 50, to bring the general air quality index close to the target range (S28). Specifically, controller 32 causes first communicator 31 to transmit a control signal to ventilator 40. In the following, the processing from steps S22 to S28 is repeated until controller 32 determines that the value of the calculated general air quality index is within the target range.

On the other hand, when controller 32 determines in step S25 that the value of the calculated general air quality index is within the target range (Yes in S25), controller 32 causes ventilator 40 to operate under an optimal condition (S29).

In this manner, air conditioner 50 is controlled when necessary in Operation Example 2. Accordingly, air conditioning system 10 can efficiently improve the air quality in the indoor space.

Operation Example 3

Figure 6:
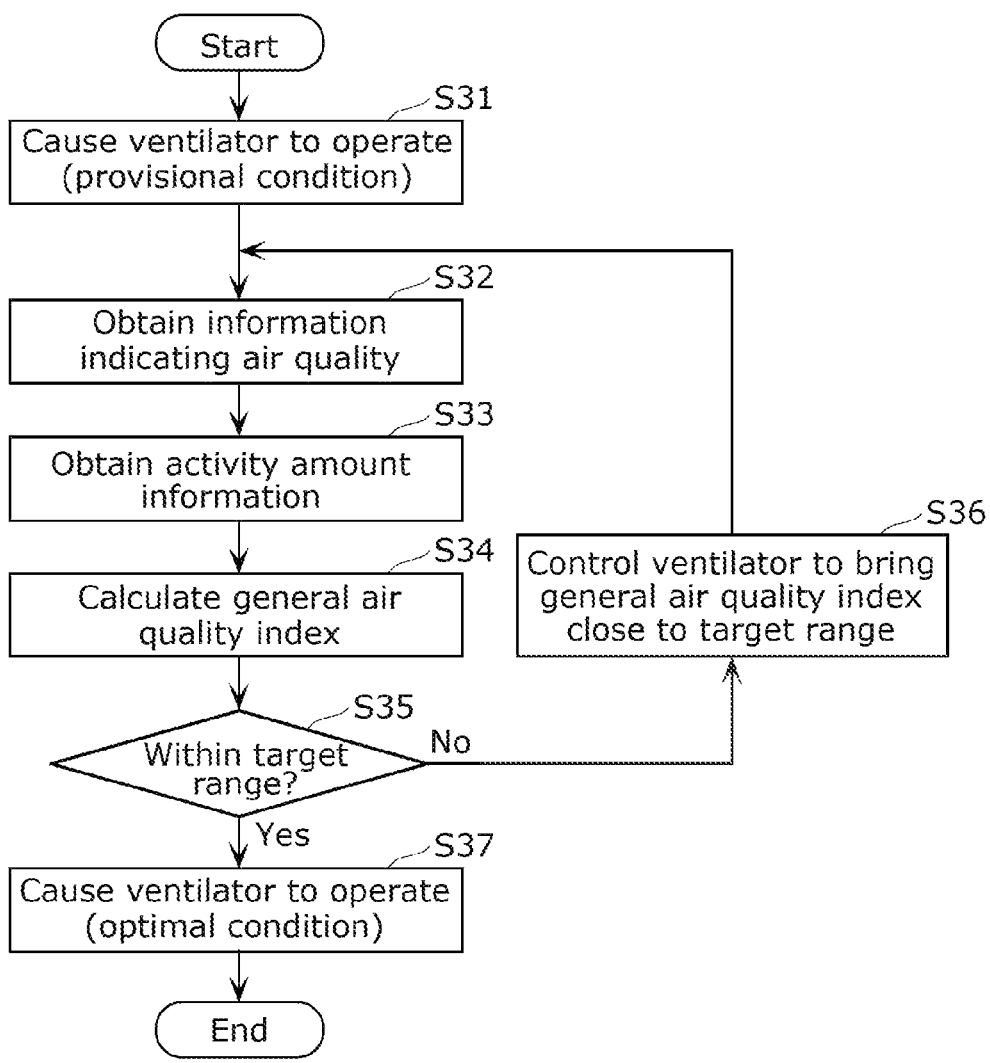
FIG. 6 is a flowchart illustrating Operation Example 3 of the air conditioning system according to the embodiment.

Next, Operation Example 3 of air conditioning system 10 is to be described with reference to FIG. 6. FIG. 6 is a flowchart illustrating Operation Example 3 of air conditioning system 10. In Operation Example 3, control device 30 calculates a general air quality index based on information indicating air quality, which is obtained from indoor sensor 21 of sensor 20, and activity amount information obtained from activity amount measurer 70, and controls ventilator 40 based on the calculated general air quality index.

First, the general air quality index used in Operation Example 3 is to be described. The general air quality index used in Operation Example 3 is expressed by $f(X_n) \times g(T, H) \times h(A)$. Here, $h(A)$ is a function with respect to activity amount A. For example, function $h(A)$ has a positive value irrespective of activity amount A, decreases with an increase in activity amount A, and increases with a decrease in activity amount A. Function $h(A)$ preferably decreases in a shape of being convex upward with an increase in the activity amount, when the horizontal axis indicates the activity amount. This is because the amount of sweat and accumulated fatigue caused due to an increase in the activity amount are low at the beginning of the activity, but rapidly increase once the activity amount exceeds a certain amount.

Next, details of Operation Example 3 in which such a general air quality index is used are to be continuously described with reference to FIG. 6.

First, controller 32 of control device 30 causes ventilator 40 to operate under a provisional condition (S31). Specifically, controller 32 causes first communicator 31 to transmit, to ventilator 40, a control signal for causing ventilator 40 to operate under a provisional condition.

Next, obtainer 35 obtains (receives) information indicating air quality in an indoor space, which is output by indoor sensor 21 of sensor 20 (S32).

Next, obtainer 35 obtains (receives) activity amount information indicating the activity amount of a person staying in the indoor space, which is output by activity amount measurer 70 (S33).

Next, controller 32 calculates a general air quality index, based on the obtained information indicating the air quality and the obtained activity amount information (S34). Subsequently, controller 32 determines whether the value of the calculated general air quality index is within a target range (S35). The target range of the general air quality index is appropriately determined based on experience or experiments. Note that the target range of the general air quality index differs depending on a combination of gas concentrations used to calculate the general air quality index.

If controller 32 determines that the value of the calculated general air quality index is out of the target range (No in S35), controller 32 controls ventilator 40 to bring the general air quality index close to the target range (S36). Specifically, controller 32 causes first communicator 31 to transmit a control signal to ventilator 40. In the following, until controller 32 determines that the value of the calculated general air quality index is within the target range, the processing from steps S32 to S36 is repeated.

On the other hand, when controller 32 determines that the value of the calculated general air quality index is within the target range (Yes in S35), controller 32 causes ventilator 40 to operate under an optimal condition (for example, a setting condition for maintaining the current state) (S37).

As described above, the general air quality index that reflects the activity amount of a person staying in the indoor space is used in Operation Example 3. Accordingly, air conditioning system 10 can improve air quality in the indoor space, taking into consideration the activity amount of a person staying in the indoor space.

Operation Example 4

Figure 7:
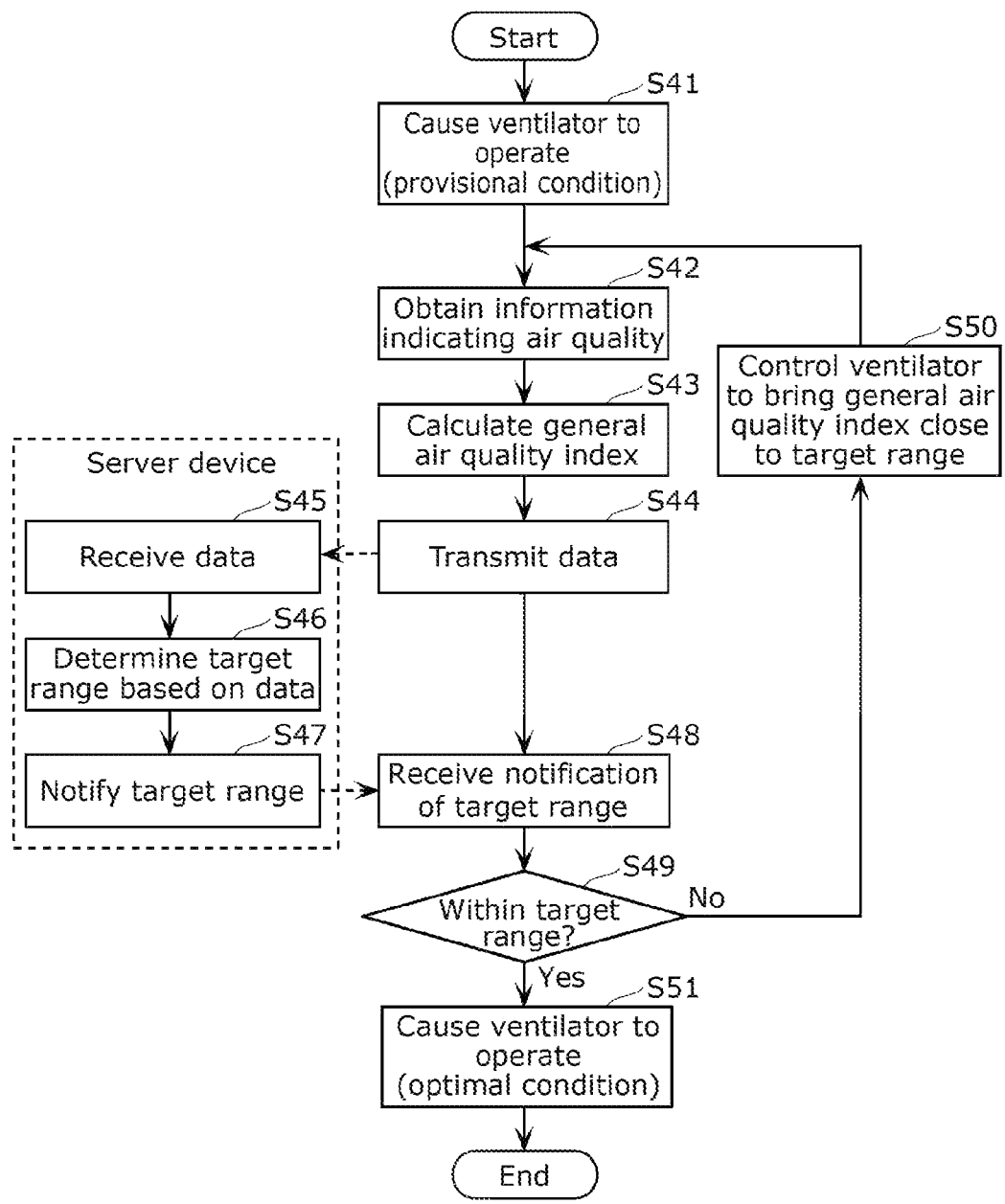
FIG. 7 is a flowchart illustrating Operation Example 4 of the air conditioning system according to the embodiment.

Next, Operation Example 4 of air conditioning system 10 is to be described with reference to FIG. 7. FIG. 7 is a flowchart illustrating Operation Example 4 of air conditioning system 10. In Operation Example 4, server device 80 provides a target range that is to be compared with a general air quality index. Note that the following describes, as Operation Example 4, the case where server device 80 provides the target range in Operation Example 1, but the case where server device 80 provides the target range in Operation Example 2 or 3 can also be considered as Operation Example 4.

First, controller 32 of control device 30 causes ventilator 40 to operate under a provisional condition (S41). Specifically, controller 32 causes first communicator 31 to transmit, to ventilator 40, a control signal for causing ventilator 40 to operate under the provisional condition.

Next, obtainer 35 obtains (receives) information indicating air quality in an indoor space, which is output by indoor sensor 21 of sensor 20 (S42).

Next, controller 32 calculates a general air quality index, based on the obtained information (S43). Subsequently, controller 32 causes second communicator 34 to transmit, to server device 80, data that includes, for instance, the information indicating the air quality in the indoor space measured by sensor 20 (that is, the information obtained in step S42), an operating status of ventilator 40, and the value of the general air quality index calculated in step S43 (S44).

Communicator 81 of server device 80 receives the data (S45), and data processor 82 determines a target range based on the received data. Server device 80 has obtained in the past similar data items from a plurality of control devices that includes control device 30, and has stored such data items into storage 83 as big data. Thus, for example, data processor 82 identifies a case highly similar to the data received in step S45 from among big data, and determines the target range provided in the identified case as a target range to be provided to control device 30 this time (S46).

Note that how the target range is determined based on received data (that is, an algorithm for determining a target range) is not limited in particular. For example, server device 80 may be a trained model achieved in advance by machine learning, and determine a target range using a training model that outputs a target range using the received data as input information.

Data processor 82 determines the target range, and thereafter notifies control device 30 of the determined target range (S47). Specifically, data processor 82 causes communicator 81 to transmit information indicating the target range to control device 30.

Second communicator 34 of control device 30 receives the information indicating the target range. Thus, control device 30 receives a notification of the target range (S48). Controller 32 determines whether the value of the general air quality index calculated in step S43 is within the target range notified in step S48 (or in other words, determined in step S46) (S49).

If controller 32 determines that the value of the calculated general air quality index is out of the target range (No in S49), controller 32 controls ventilator 40 to bring the general air quality index close to the target range (S50).

On the other hand, when controller 32 determines that the value of the calculated general air quality index is within the target range (Yes in S49), controller 32 causes ventilator 40 to operate under an optimal condition (for example, a setting condition for maintaining the current state) (S51).

As described above, server device 80 determines a target range and provides control device 30 with the target range in Operation Example 4. If server device 80 determines a target range based on, for instance, data from another control device and data received in the past by control device 30, air conditioning system 10 can control devices such as ventilator 40, based on a comparison between a more appropriate target range and the general air quality index.

Operation Example 5

Figure 8:
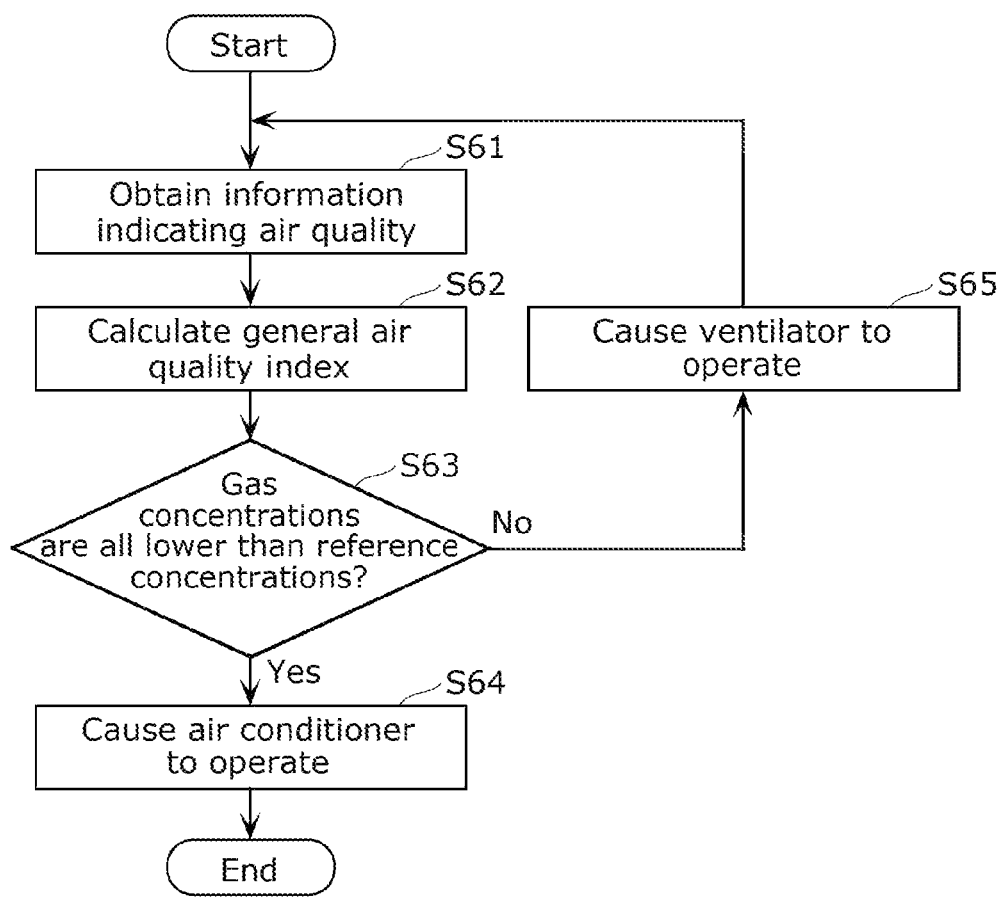
FIG. 8 is a flowchart illustrating Operation Example 5 of the air conditioning system according to the embodiment.

There are a plurality of combinations of types of gases, temperature, and humidity, for instance that are used to calculate a general air quality index, yet what is given priority to control devices (cause the devices to operate) can be more considered in order to cause the general air quality index to fall within a target range. Accordingly, Operation Example 5 in which a decrease in a gas concentration is given priority over improving comfort is to be described with reference to FIG. 8. FIG. 8 is a flowchart illustrating Operation Example 5 of air conditioning system 10.

First, obtainer 35 of control device 30 obtains information indicating air quality in an indoor space, which is output by indoor sensor 21 of sensor 20 (S61), and controller 32 calculates a general air quality index, based on the obtained information (S62). The general air quality index is, for example, the same as the index used in Operation Example 1, but may be the same as the index used in Operation Example 2 or 3.

Next, controller 32 determines, based on the obtained information indicating the air quality, whether all the gas concentrations (that is, the gas concentrations indicated by $X_n$) used to calculate the general air quality index are lower than reference concentrations (S63). For example, when n=3, $X_1$ denotes a $CO_2$ concentration, $X_2$ denotes a PM concentration, and $X_3$ denotes a TVOC concentration, controller 32 determines, based on the reference concentrations illustrated in FIG. 3, whether $X_1$ ($CO_2$ concentration)<1000 ppm, and $X_2$ (PM concentration)<30 ppm, and furthermore $X_3$ (TVOC concentration)<400 μg/m³.

If controller 32 determines that all the gas concentrations indicated by $X_n$ are lower than the reference concentrations (Yes in S63), controller 32 causes air conditioner 50 disposed in the indoor space to operate to bring the general air quality index close to a target range (S64).

On the other hand, if controller 32 determines that at least one gas concentration indicated by $X_n$ is higher than or equal to the reference concentration (No in S63), controller 32 causes ventilator 40 to operate (S65). The processing of steps S61 to S63 and step S65 is repeated until all the gas concentrations indicated by $X_n$ are lower than the reference concentrations. After the concentration of the gas higher than or equal to the reference concentration is decreased below the reference concentration by causing ventilator 40 to operate (Yes in S63), controller 32 causes air conditioner 50 disposed in the indoor space to operate to bring the general air quality index close to the target range.

As described above, in Operation Example 5, after the value of $f(X_n)$ is increased (or in other words, a gas concentration is decreased), the value of g(T, H) is increased (or in other words, comfort is improved) to bring the general air quality index close to the target range. Thus, air conditioning system 10 can give priority to decreasing a gas concentration over improving comfort.

Operation Example 6

Figure 9:
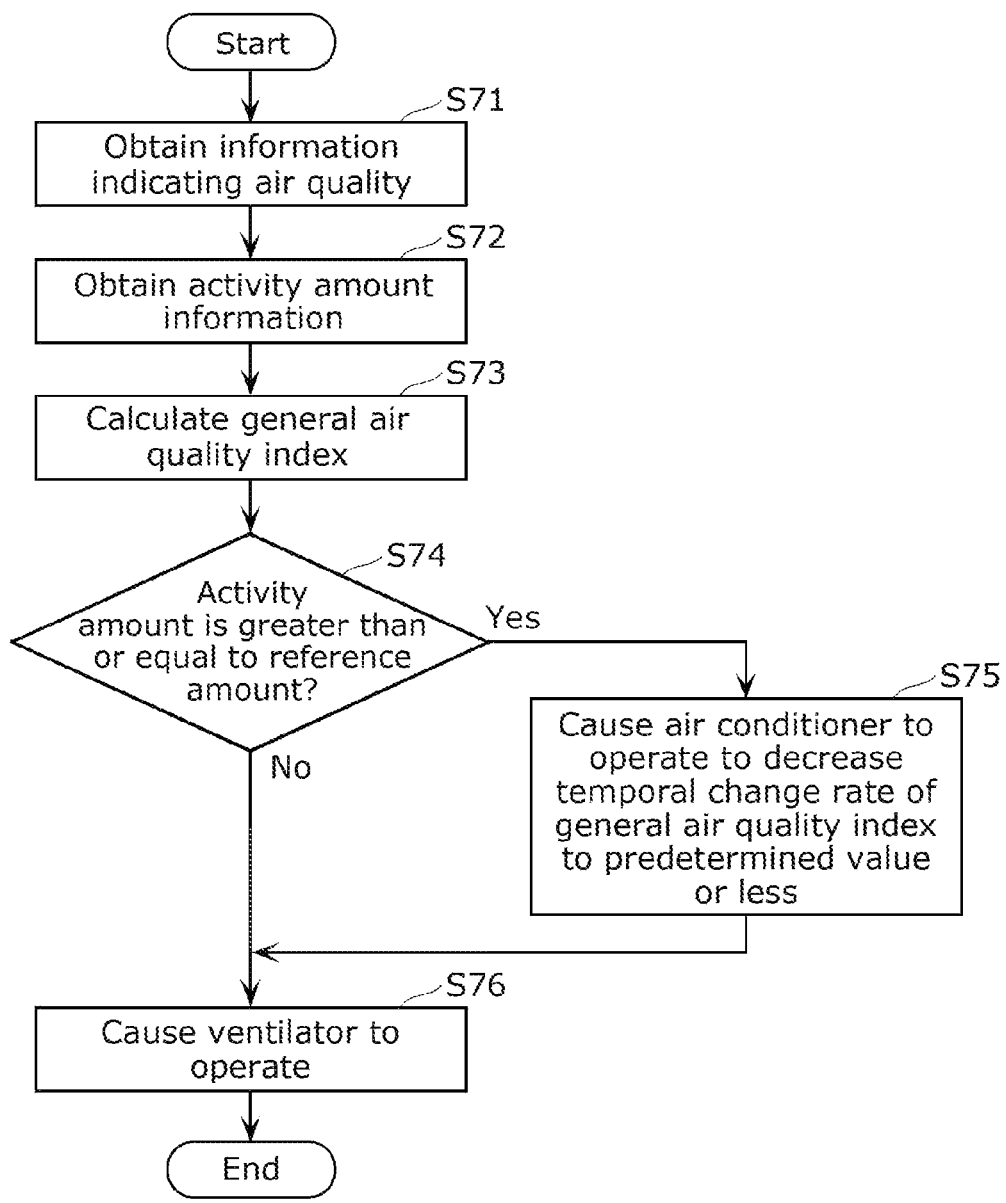
FIG. 9 is a flowchart illustrating Operation Example 6 of the air conditioning system according to the embodiment.

Next, Operation Example 6 in which improving comfort is given priority over decreasing a gas concentration is to be described with reference to FIG. 9. FIG. 9 is a flowchart illustrating Operation Example 6 of air conditioning system 10.

First, obtainer 35 of control device 30 obtains information indicating air quality in an indoor space, which is output by indoor sensor 21 of sensor 20 (S71), and obtains (receives) activity amount information indicating the activity amount of a person staying in the indoor space, which is output by activity amount measurer 70 (S72).

Next, controller 32 calculates a general air quality index, based on the obtained information indicating the air quality and the obtained activity amount information (S73). The general air quality index is the same as the index used in Operation Example 3.

Next, controller 32 determines whether the activity amount indicated by the activity amount information is greater than or equal to a reference amount, based on the obtained activity amount information (S74). When controller 32 determines that the activity amount indicated by the activity amount information is greater than or equal to the reference amount (Yes in S74), controller 32 causes air conditioner 50 disposed in the indoor space to operate to decrease a temporal change rate of the general air quality index to a predetermined value or less (S75). Stated differently, controller 32 stabilizes a change in the general air quality index. The predetermined value here is 20%, for example, but may be another value. After that, controller 32 causes ventilator 40 to operate to bring the general air quality index close to a target range (S76).

On the other hand, when controller 32 determines that the activity amount indicated by the activity amount information is less than a reference amount (No in S74), controller 32 causes ventilator 40 to operate to bring the general air quality index close to the target range (S76).

As described above, in Operation Example 6, when the activity amount of a person staying in an indoor space is relatively large so that the person readily feels uncomfortable due to temperature and humidity, the value of g(T, H) is increased (or in other words, comfort is improved), and thereafter the value of $f(X_n)$ is increased (or in other words, a gas concentration is decreased) to bring the general air quality index close to the target range. Thus, air conditioning system 10 can give priority to improving comfort over decreasing a gas concentration.

Advantageous Effects and Others

As described above, air conditioning system 10 includes: sensor 20 that measures air quality in an indoor space; obtainer 35 that obtains information indicating the air quality in the indoor space, the information being output by sensor 20; and controller 32 that calculates an air quality index (the general air quality index in the above embodiment) based on the information obtained, and controls ventilator 40 that ventilates the indoor space, based on the air quality index calculated. The air quality index is expressed by $f(X_n) \times g(T, H)$, where $f(X_n)$ denotes a function with respect to $X_n$ that indicates at least one of a $CO_2$ concentration, a concentration of total volatile organic compounds (TVOC), a concentration of particulate matter (PM), an $NO_X$ concentration, an $SO_X$ concentration, an $O_3$ concentration, a mold count, or a dust count, and g(T, H) denotes a function with respect to T denoting temperature and H denoting humidity in the indoor space.

Such air conditioning system 10 controls ventilator 40 based on the general air quality index for which the degrees of influence exerted by a concentration of, for instance, a pollutant, temperature, and humidity are considered, and thus can effectively improve the air quality in the indoor space.

For example, $f(X_n)$ is expressed by (Expression 1) above, where $a_n$ denotes a coefficient, and g(T, H) is expressed by (Expression 2) above, where DI(T, H) denotes a function indicating a discomfort index, and α and β denote coefficients.

In this manner, if the air quality index is calculated using natural logarithms, the influence of a gas concentration and others on the air quality index can be smoothed. In other words, a difference of the degrees of influence of a gas concentration and others on the air quality index can be decreased.

For example, $f(X_n)$ is expressed by (Expression 1') above, where $a_n$ and $c_n$ denote coefficients, and g(T, H) is expressed by (Expression 2) above, where DI(T, H) denotes a function indicating a discomfort index, and α and β denote coefficients.

In this manner, if the air quality index is calculated by normalizing a gas concentration and others, the influence of, for instance, a gas concentration and others on the air quality index can be smoothed. In other words, a difference of the degrees of influence of a gas concentration and others on the air quality index can be decreased.

For example, controller 32 brings the air quality index close to a target range by causing air conditioner 50 disposed in the indoor space to operate when each gas concentration denoted by $X_n$ is lower than a reference concentration.

Such air conditioning system 10 can improve air quality by improving comfort when the gas concentrations are relatively low.

For example, when at least one gas concentration denoted by $X_n$ is higher than or equal to a reference concentration, controller 32 decreases the at least one gas concentration to a gas concentration below the reference concentration by causing ventilator 40 to operate, and thereafter causes air conditioner 50 disposed in the indoor space to operate to bring the air quality index close to a target range.

Such air conditioning system 10 can give priority to decreasing a gas concentration to improve air quality over improving comfort.

Further, air conditioning system 10 includes: sensor 20 that measures air quality in an indoor space and air quality in an outdoor space; obtainer 35 that obtains first information indicating the air quality in the indoor space and second information indicating the air quality in the outdoor space, the first information and the second information being output by sensor 20; and controller 32 that calculates an air quality index based on the first information obtained and the second information obtained, and controls ventilator 40 that ventilates the indoor space and air conditioner 50 disposed in the indoor space, based on the air quality index calculated. The air quality index is expressed by $f(X_n) \times g_{in}(T_{in}, H_{in}) \times g_{out}(T_{out}, H_{out})$, where $f(X_n)$ denotes a function with respect to $X_n$ that indicates at least one of a $CO_2$ concentration, a concentration of total volatile organic compounds (TVOC), a concentration of particulate matter (PM), an $NO_X$ concentration, an $SO_X$ concentration, an $O_3$ concentration, a mold count, or a dust count, $g_{in}(T_{in}, H_{in})$ denoting a function with respect to $T_{in}$ denoting temperature and $H_{in}$ denoting humidity in the indoor space, and $g_{out}(T_{out}, H_{out})$ denoting a function with respect to $T_{out}$ denoting temperature and $H_{out}$ denoting humidity in the outdoor space. When controller 32 determines that the air quality index obtained when $g_{in}(T_{in}, H_{in})$ is assumed to be 1 is to reach a target range as a result of ventilator 40 operating, controller 32 brings the air quality index close to the target range by causing ventilator 40 to operate. When controller 32 determines that the air quality index obtained when $g_{in}(T_{in}, H_{in})$ is assumed to be 1 is not to reach the target range as a result of ventilator 40 operating, controller 32 brings the air quality index close to the target range by causing air conditioner 50 to operate.

Such air conditioning system 10 controls air conditioner 50 as necessary, and thus the air quality in the indoor space can be improved effectively.

Further, air conditioning system 10 includes: sensor 20 that measures air quality in an indoor space; activity amount measurer 70 that measures an activity amount of a person staying in the indoor space; obtainer 35 that obtains information indicating the air quality in the indoor space, and activity amount information indicating the activity amount of the person, the information being output by sensor 20, the activity amount information being output by activity amount measurer 70; and controller 32 that calculates an air quality index based on the information obtained and the activity amount information obtained, and controls ventilator 40 that ventilates the indoor space, based on the air quality index calculated. The air quality index is expressed by $f(X_n) \times g(T, H) \times h(A)$, where $f(X_n)$ denotes a function with respect to $X_n$ that indicates at least one of a $CO_2$ concentration, a concentration of total volatile organic compounds (TVOC), a concentration of particulate matter (PM), an $NO_X$ concentration, an $SO_X$ concentration, an $O_3$ concentration, a mold count, or a dust count, g(T, H) denotes a function with respect to T denoting temperature and H denoting humidity in the indoor space, and h(A) denotes a function with respect to A denoting an activity amount.

Such air conditioning system 10 can improve air quality in the indoor space, taking into consideration the activity amount of a person staying in the indoor space.

For example, the function denoted by h(A) has a positive value irrespective of the activity amount denoted by A, decreases with an increase in the activity amount denoted by A, and increases with a decrease in the activity amount denoted by A.

Such air conditioning system 10 can improve air quality in the indoor space, taking into consideration the activity amount of a person staying in the indoor space.

For example, when the activity amount indicated by the activity amount information is greater than or equal to a reference amount, controller 32 decreases a temporal change rate of the air quality index to a predetermined value or less by causing air conditioner 50 disposed in the indoor space to operate, and thereafter brings the air quality index close to a target range by causing ventilator 40 to operate.

Such air conditioning system 10 can give priority to improving comfort over decreasing gas concentrations, when the activity amount of a person staying in the indoor space is relatively large so that the person readily feels uncomfortable due to temperature and humidity.

For example, ventilator 40 includes air supply device 41 that supplies air to the indoor space, and includes air filter 41a that decreases at least one of a PM concentration, an $NO_X$ concentration, an $SO_X$ concentration, or an $O_3$ concentration in the air to be supplied to the indoor space. Air filter 41a is an example of a removal function.

Such air conditioning system 10 can decrease at least one of a PM concentration, an $NO_X$ concentration, an $SO_X$ concentration, or an $O_3$ concentration, by controlling ventilator 40.

For example, air conditioning system 10 further includes: air cleaner 60 having a function of decreasing at least one of a PM concentration, an $NO_X$ concentration, an $SO_X$ concentration, or an $O_3$ concentration in the indoor space. Air cleaner 60 is an example of a removal device.

Such air conditioning system 10 can decrease at least one of a PM concentration, an $NO_X$ concentration, an $SO_X$ concentration, or an $O_3$ concentration, by controlling air cleaner 60.

For example, air conditioning system 10 further includes: server device 80 that includes data processor 82 that determines a target range of the air quality index, based on the information indicating the air quality in the indoor space measured by sensor 20, an operating status of ventilator 40, and the air quality index. Controller 32 brings the air quality index close to the target range determined, by controlling at least ventilator 40.

Accordingly, if server device 80 determines the target range based on, for instance, data from another control device and data received in the past by control device 30, air conditioning system 10 can control devices such as ventilator 40, based on a comparison between a more appropriate target range and the air quality index.

Other Embodiments

The above has described the air conditioning system according to the embodiment, yet the present invention is not limited to the above embodiment.

For example, in the above embodiment, the general air quality index has a positive value that increases as the air quality of the indoor space is higher, but may be a positive value that decreases as the air quality of the indoor space is higher.

In the above embodiment, the air conditioning system is achieved by a plurality of devices, but may be achieved as a single device. If the air conditioning system is achieved by a plurality of devices, the elements included in the air conditioning system may be distributed to the plurality of devices in any manner.

In the above embodiment, each of the elements may be constituted by dedicated hardware, or may be achieved by executing a software program suitable for the element. Each element may be achieved by a program executor such as a CPU or a processor reading and executing a software program recorded on a recording medium such as a hard disk or semiconductor memory.

The elements may be circuits (or integrated circuits). These circuits may form one circuit as a whole, or may be separate circuits. Furthermore, each circuit may be a general-purpose circuit or a dedicated circuit.

A general or specific aspect of the present invention may be achieved by a system, a device, a method, an integrated circuit, a computer program, or a computer-readable recording medium such as a CD-ROM, or any combination of systems, devices, methods, integrated circuits, computer programs, or recording media. For example, the present invention may be achieved as a control device in the above embodiment (or a system corresponding to the control device). The present invention may be achieved as an air conditioning method executed by a computer such as an air conditioning system according to the above embodiment. The present invention may be achieved as a program for a computer to execute such an air conditioning method or may be achieved as a computer-readable non-transitory recording medium in which such a program is stored.

The processing orders of the processes in the flowcharts described in the above embodiment are examples. The processing orders of the processes may be changed, or the processes may be executed in parallel. Furthermore, a process that a particular processing unit executes may be executed by another processing unit.

The present invention may also include embodiments as a result of adding, to the embodiments, various modifications that may be conceived by those skilled in the art, and embodiments obtained by combining elements and functions in the embodiments in any manner without departing from the scope of the present invention.

REFERENCE SIGNS LIST 10 air conditioning system
20 sensor
32 controller
35 obtainer
40 ventilator
41 air supply device
41a air filter (removal function)
50 air conditioner
60 air cleaner (removal device)
70 activity amount measurer
80 server device
82 data processor

The invention claimed is:

1. An air conditioning system comprising:
a sensor that measures air quality in an indoor space;
an obtainer that obtains information indicating the air quality in the indoor space, the information being output by the sensor; and
a controller that calculates an air quality index based on the information obtained, and controls a ventilator that ventilates the indoor space, based on the air quality index calculated,
wherein the air quality index is expressed by $f(X_n) \times g(T, H)$, where $f(X_n)$ denotes a function with respect to $X_n$ that indicates at least one of a carbon dioxide ($CO_2$) concentration, a concentration of total volatile organic compounds (TVOC), a concentration of particulate matter (PM), a nitric oxide ($NO_X$) concentration, a sulfur oxide ($SO_X$) concentration, a trioxygen ($O_3$) concentration, a mold count, or a dust count, and $g(T, H)$ denotes a function with respect to T denoting temperature and H denoting humidity in the indoor space, and
when at least one gas concentration denoted by $X_n$ is higher than or equal to a reference concentration, the controller decreases the at least one gas concentration to a gas concentration below the reference concentration by causing the ventilator to operate, and thereafter causes an air conditioner disposed in the indoor space to operate to bring the air quality index close to a target range.

2. The air conditioning system according to claim 1, wherein $f(X_n)$ is expressed by

[Math. 1]
$$f(X_n) = \frac{1}{\sum_{k=1}^{n} a_k \cdot \ln(X_k)}$$

where $a_n$ denotes a coefficient, and $g(T, H)$ is expressed by

[Math. 2]
$$g(T, H) = \frac{\beta}{\alpha + \text{ABS}(DI(T, H) - 67.5)}$$

where $DI(T, H)$ denotes a function indicating a discomfort index, and $\alpha$ and $\beta$ denote coefficients.

3. The air conditioning system according to claim 1, wherein $f(X_n)$ is expressed by

[Math. 3]
$$f(X_n) = \frac{1}{\sum_{k=1}^{n} a_k \cdot X_k / C_k}$$

where $a_n$ and $c_n$ denote coefficients, and $g(T, H)$ is expressed by

[Math. 4]
$$g(T, H) = \frac{\beta}{\alpha + \text{ABS}(DI(T, H) - 67.5)}$$

where $DI(T, H)$ denotes a function indicating a discomfort index, and $\alpha$ and $\beta$ denote coefficients.

4. The air conditioning system according to The air conditioning system according to wherein the controller brings the air quality index close to the target range by causing an air conditioner disposed in the indoor space to operate when each gas concentration denoted by $X_n$ is lower than the reference concentration.

5. The air conditioning system according to claim 1, wherein the ventilator includes an air supply device that supplies air to the indoor space, and has a removal function of decreasing at least one of a PM concentration, an $NO_X$ concentration, an $SO_X$ concentration, or an $O_3$ concentration in the air to be supplied to the indoor space.

6. The air conditioning system according to claim 1, further comprising:
a removal device having a function of decreasing at least one of a PM concentration, an $NO_X$ concentration, an $SO_X$ concentration, or an $O_3$ concentration in the indoor space.

7. The air conditioning system according to claim 1, further comprising: a server device that includes a data processor that determines the target range of the air quality index, based on the information indicating the air quality in the indoor space measured by the sensor, an operating status of the ventilator, and the air quality index, wherein the controller brings the air quality index close to the target range determined, by controlling at least the ventilator.

8. An air conditioning system comprising:
a sensor that measures air quality in an indoor space and air quality in an outdoor space;
an obtainer that obtains first information indicating the air quality in the indoor space and second information indicating the air quality in the outdoor space, the first information and the second information being output by the sensor; and
a controller that calculates an air quality index based on the first information obtained and the second information obtained, and controls a ventilator that ventilates the indoor space and an air conditioner disposed in the indoor space, based on the air quality index calculated,
wherein the air quality index is expressed by $f(X_n) \times g_{in}(T_{in}, H_{in}) \times g_{out}(T_{out}, H_{out})$, where $f(X_n)$ denotes a function with respect to $X_n$ that indicates at least one of a carbon dioxide ($CO_2$) concentration, a concentration of total volatile organic compounds (TVOC), a concentration of particulate matter (PM), a nitric oxide ($NO_X$) concentration, a sulfur oxide ($SO_X$) concentration, a trioxygen ($O_3$) concentration, a mold count, or a dust count, $g_{in}(T_{in}, H_{in})$ denoting a function with respect to $T_{in}$ denoting temperature and $H_{in}$ denoting humidity in the indoor space, and $g_{out}(T_{out}, H_{out})$ denoting a function with respect to $T_{out}$ denoting temperature and $H_{out}$ denoting humidity in the outdoor space,
when the controller determines that the air quality index obtained when $g_{in}(T_{in}, H_{in})$ is assumed to be 1 is to reach a target range as a result of the ventilator operating, the controller brings the air quality index close to the target range by causing the ventilator to operate, and
when the controller determines that the air quality index obtained when $g_{in}(T_{in}, H_{in})$ is assumed to be 1 is not to reach the target range as a result of the ventilator operating, the controller brings the air quality index close to the target range by causing the air conditioner to operate.

9. An air conditioning system comprising:
a sensor that measures air quality in an indoor space;
an activity amount measurer that measures an activity amount of a person staying in the indoor space;
an obtainer that obtains information indicating the air quality in the indoor space, and activity amount information indicating the activity amount of the person, the information being output by the sensor, the activity amount information being output by the activity amount measurer; and
a controller that calculates an air quality index based on the information obtained and the activity amount information obtained, and controls a ventilator that ventilates the indoor space, based on the air quality index calculated,
wherein the air quality index is expressed by $f(X_n) \times g(T, H) \times h(A)$, where $f(X_n)$ denotes a function with respect to $X_n$ that indicates at least one of a carbon dioxide ($CO_2$) concentration, a concentration of total volatile organic compounds (TVOC), a concentration of particulate matter (PM), a nitric oxide ($NO_X$) concentration, a sulfur oxide ($SO_X$) concentration, a trioxygen ($O_3$) concentration, a mold count, or a dust count, $g(T, H)$ denotes a function with respect to $T$ denoting temperature and $H$ denoting humidity in the indoor space, and $h(A)$ denotes a function with respect to $A$ denoting an activity amount, and when the activity amount indicated by the activity amount information is greater than or equal to a reference amount, the controller decreases a temporal change rate of the air quality index to a predetermined value or less by causing an air conditioner disposed in the indoor space to operate, and thereafter brings the air quality index close to a target range by causing the ventilator to operate.

10. The air conditioning system according to claim 9, wherein the function denoted by h(A) has a positive value irrespective of the activity amount denoted by A, decreases with an increase in the activity amount denoted by A, and increases with a decrease in the activity amount denoted by A.

\* \* \* \* \*